United States Patent [19]

Nuber et al.

[11] Patent Number: 4,816,534

[45] Date of Patent: Mar. 28, 1989

[54] PREPARATION OF VINYLPYRROLIDONE POLYMERS

[75] Inventors: Adolf Nuber, Boehl-Iggelheim; Walter Denzinger, Speyer; Axel Sanner, Frankenthal, all of Fed. Rep. of Germany

[73] Assignee: BASF Aktiengesellschaft, Ludwigshafen, Fed. Rep. of Germany

[21] Appl. No.: 132,036

[22] Filed: Dec. 14, 1987

[30] Foreign Application Priority Data

Dec. 13, 1986 [DE] Fed. Rep. of Germany ....... 3642633

[51] Int. Cl.$^4$ .................................................. C08F 4/28
[52] U.S. Cl. ...................................... 526/227; 526/264
[58] Field of Search ......................................... 526/227

[56] References Cited

U.S. PATENT DOCUMENTS 4,644,020  2/1987  Stahl ..................................... 526/227

FOREIGN PATENT DOCUMENTS

| 1211892 | 9/1986 | Canada . | |
|---|---|---|---|
| 0104042 | 3/1984 | European Pat. Off. . | |
| 0215379 | 4/1986 | European Pat. Off. . | |
| 2137105 | 7/1971 | Fed. Rep. of Germany | 526/227 |
| 2188609 | 1/1974 | France | 526/227 |
| 39-1815 | 5/1964 | Japan | 526/227 |
| 46-21726 | 6/1971 | Japan | 526/227 |
| 0044604 | 3/1982 | Japan | 526/227 |
| 1021121 | 2/1966 | United Kingdom | 526/227 |

Primary Examiner—Joseph L. Schofer
Assistant Examiner—N. Sarofim
Attorney, Agent, or Firm—Keil & Weinkauf

[57] ABSTRACT

Hydrazine-free vinlypyrrolidone polymers which dissolve in water and organic solvents to give a clear solution are prepared by polymerization using di-tert-butyl peroxide in an aqueous medium.

2 Claims, No Drawings

PREPARATION OF VINYLPYRROLIDONE POLYMERS

The present invention relates to a process for the preparation of hydrazine-free N-vinyl-2-pyrrolidone polymers which dissolve in water and organic solvents to give a clear solution by polymerization with di-tert-butyl peroxide in aqueous solution.

N-vinyl-2-pyrrolidone (VP) can be polymerized in water or in organic solvents. As a rule, water is preferred, primarily for economic and ecological reasons.

The most well known process for the polymerization of VP in water uses hydrogen peroxide as an initiator, with the addition of ammonia to adjust the pH (DE-B No. 922 378). In this process, a small amount of hydrazine is formed, which is undesirable in many cases (Pharmacopeial Forum of the US Pharmacopeial Convention, Inc., Rochville, Md., March-April 1985, page 218). If ammonia is replaced with sodium hydroxide solution, hydrazine-free products are obtained but the latter have a higher content of inorganic components (ash content greater than 0.02%), which may lead to cloudiness when used in organic solvents (German patent application No. 35 32 747.2). It has also been suggested (EP-A No. 104 042) that polymerization be effected using tert-butyl perpivalate as an initiator. However, this procedure does not as a rule give polymers which dissolve in water to form a clear solution.

It is an object of the present invention to provide a process for the preparation of VP polymers which avoids these disadvantages.

We have found that this object is achieved by a process for the preparation of hydrazine-free VP polymers which dissolve in water and organic solvents to give a clear solution and contain not less than 50, preferably not less than 60, in particular from 70 to 100%, by weight of VP as copolymerized units, wherein from 0.1 to 3, preferably from 0.2 to 2%, by weight, based on monomer or, where relevant, on the monomer mixture, of di-tert-butyl-peroxide, if necessary diluted up to 100 times in solution in an organic solvent or aqueous emulsion, are added to 10 to 80, preferably 15 to 70%, strength by weight aqueous monomer solution, and the stirred mixture is kept for from 1 to 15, preferably from 2 to 10, hours at from 100° to 160° C., preferably from 110° to 145° C., the desired molecular weight being set in the Fikentscher K value range (H. Fikentscher, Cellulosechemie 13 (1932), 58–64 and 71–74) of from 10 to 100, preferably from 20 to 90, by adding from 0 to 100% by weight, based on monomer, of a regulator, preferably isopropanol.

According to the invention, the polymerization is carried out as follows: part of the components of the mixture is metered into a pressure vessel tested at 200 bar, the air is removed by evacuation or by blowing through an inert gas and the temperature is increased to 100°–160° C., preferably 110°–145° C. The remaining amount is metered in by running in the monomers, solvent, regulator and initiator in the course of from 1 to 7 hours.

The K value is obtained as follows:
1. By selecting the type and amount of regulator used.
2. By selecting the amount of peroxide; large amounts give low K values.
3. By controlling the monomer concentration; an increase in the monomer concentration also results in an increase in the K value.
4. By selecting the polymerization temperature; an increase in the temperature produces a decrease in the K value.

The addition of buffer substances during the polymerization is not generally necessary. However, it is frequently advantageous to add small amounts, preferably from 0.1 to 1% by weight, based on the monomer, of an amine, eg. triethylamine.

In order to obtain a purely aqueous polymer solution, the organic solvent (regulator) is distilled off after the polymerization. It is often advantageous to carry out a steam distillation in order simultaneously to remove other volatile components which originate, for example, from VP or from the initiator.

The process can be carried out batchwise or continuously. In the batchwise procedure, it is advantageous, particularly at fairly high monomer concentration, initially to take only part of the monomer or monomers and gradually to run in the remainder. In the case of relatively high monomer concentrations, the initially taken material should be more dilute than the feed.

The process is particularly important for the preparation of homopolymers of VP, although it is equally possible also to prepare copolymers of VP by polymerizing VP together with other ethylenically unsaturated monomers which are copolymerizable with VP.

Particularly suitable comonomers are those of vinyl esters with carboxylic acids with 1 to 4 carbon atoms, preferably vinyl acetate and vinyl propionate, (meth)acrylic acid and its derivatives, in particular its esters with $C_1$-$C_4$-alcohols, for example methyl (meth)acrylate, hydroxyethyl and hydroxypropyl (meth)acrylate, acrylamide and methacrylamide, and vinylimidazole and quaternized vinylimidazole and vinylcaprolactam, or mixtures of the stated monomers. When choosing the type and amount of the comonomers, the water solubility of the copolymer should be borne in mind.

To facilitate metering, in particular in the case of gradual addition over a prolonged period, the di-tert-butyl peroxide is advantageously diluted. This can be done either with the aid of an organic solvent which is preferably water-soluble, eg. isopropanol, ethanol or methanol, or with the aid of water and a dispersant. It is advantageous to choose a dispersant which dissolves in water to give a clear solution, for example an ionic dispersant.

Advantageously used molecular weight regulators are alcohols, preferably secondary alcohols, in particular isopropanol, and thio compounds, such as dodecyl mercaptan and 2-mercaptoethanol.

The inventive concept is based on the combined use of di-tert-butyl peroxide, as an initiator, and an aqueous polymerization medium.

The aqueous medium is intended to be water, which may contain up to 50% by weight of a molecular weight regulator.

The conversion of VP is generally higher than 99.9%.

In the Examples, parts and percentages are by weight.

Measurement of the K value was always carried out on a 1% strength solution in water at 25° C.

EXAMPLE 1

45 parts of water, 183 parts of isopropanol, 50 parts of VP and 0.3 part of di-tert-butyl peroxide were initially taken in a pressure reactor equipped with a stirrer. The reactor was closed so that it was pressure tight, and was substantially freed from atmospheric oxygen by forcing in nitrogen under 4 bar and letting down the pressure again, this procedure being repeated 3 times. The reactor contents were then heated to 130° C., the resulting pressure being 3.8 bar, after which a solution of 450 parts of VP, 1 part of triethylamine and 405 parts of water and a solution of 2.7 parts of di-tert-butyl peroxide in 117 parts of isopropanol were introduced at 130° C., in each case in the times shown in the Table below. Polymerization was then continued until the monomer content had fallen below 0.1% (based on the monomer used), which took about a further 3 hours. The mixture was cooled to 80° C., and the isopropanol was then expelled by passing in steam. When the internal temperature had reached 98° C., distillation was continued until a further 15 parts of distillate had passed over. A clear purely aqueous solution was obtained.

TABLE

| Experiment | Feed times | K value |
|---|---|---|
| a | 4 h | 44.3 |
| b | 6 h | 38.9 |

EXAMPLE 2

The procedure described in Example 1a was followed, except that the polymerization temperature was 120° C. The K value of the virtually colorless, clear, aqueous polymer solution was 58.3.

EXAMPLE 3

The procedure described in Example 1a was followed, except that the amount of di-tert-butyl peroxide in the initially taken mixture was 0.15 part and that in the feed was 1.35 parts. When the addition was complete, a further 0.5 part of di-tert-butyl peroxide was added all at once to effect further polymerization. The K value of the clear, aqueous polymer solution was 54.6.

EXAMPLE 4

515 parts of water, 100 parts of isopropanol, 60 parts of VP and 1.5 parts of di-tert-butyl peroxide were initially taken in an apparatus as described in Example 1. The reactor was closed so that it was pressure tight, after which nitrogen under 4 bar was forced in and the pressure let down again, this procedure being repeated twice. The reactor contents were heated to 140° C., the resulting pressure being 5.1 bar. Thereafter, a solution of 540 parts of vinylpyrrolidone in 970 parts of water and 380 parts of isopropanol was introduced in the course of 4 hours, and a solution of 14 parts of di-tert-butyl peroxide in 120 parts of isopropanol was fed in in the course of 5 hours at 140° C. Polymerization was then continued for a further 3 hours. Working up was carried out as in Example 1.

The clear polymer solution of about 25% strength was spray-dried. The colorless polymer had a K value of 24.0.

EXAMPLE 5

640 parts of water, 120 parts of VP and 0.5 part of di-tert-butyl peroxide were initially taken in a pressure reactor equipped with a stirrer, and the atmospheric oxygen was substantially displaced by forcing in nitrogen under 4 bar and letting down the pressure again. The reactor contents were heated to 130° C., the resulting pressure being 2.1 bar, after which a solution of 1,080 parts of vinylpyrrolidone, 2 parts of triethylamine and 1,980 parts of water was metered in over 3.5 hours, and an emulsion of 5.5 parts of di-tert-butyl peroxide in 100 parts of water (20 parts of sodium cetylsulfonate as emulsifier) was introduced in the course of 4 hours at 130° C. Polymerization was then continued at 130° C. until the residual monomer content had fallen below 0.1% (based on the VP used), which took a further 2.5 hours. The K value of the highly viscous, colorless and clear polymer solution was 80.5.

EXAMPLE 6

530 parts of water, 20 parts of isopropanol, 120 part of vinylpyrrolidone and 0.7 part of di-tert-butyl peroxide were initially taken under nitrogen in a pressure reactor equipped with a stirrer and the mixture was heated to 130° C., after which a solution of 1,080 parts of VP, 2 parts of triethylamine and 1,080 parts of water (monomer feed) and a solution of 6.5 parts of di-tert-butyl peroxide in 170 parts of isopropanol were metered in, each in the course of 4 hours at 130° C. Polymerization and working up were carried out as in Example 1.

The K value of the clear, colorless polymer solution was 68.4.

EXAMPLE 7

The procedure described in Example 6 was followed, except that, in addition, the initially taken mixture contained 1 part of allyl alcohol and the monomer feed contained 11 parts of allyl alcohol. The K value of the clear polymer solution was 55.1.

EXAMPLE 8

The procedure described in Example 6 was followed, except that, in addition, the initially taken mixture contained 0.3 part of mercaptoethanol and the monomer feed contained 2.7 parts of mercaptoethanol. The K value of the clear polymer solution was 34.9.

EXAMPLE 9

410 parts of water, 19 parts of isopropanol, 110 parts of VP and 0.5 part of di-tert-butyl peroxide were initially taken in a pressure reactor equipped with a stirrer and were heated to 125° C. under nitrogen. Thereafter, a solution of 730 parts of VP and 360 parts of hydroxypropyl acrylate in 1,200 parts of water and a solution of 4.3 parts of di-tert-butyl peroxide in 170 parts of isopropanol were metered in, each in the course of 5 hours at 130° C. To complete the polymerization, heating was continued for a further 3.5 hours at 130° C. Working up was carried out as described in Example 1.

The K value of the polymer solution was 33.2 and the residual monomer content was 0.1% (based on copolymer).

EXAMPLE 10

530 parts of water, 20 parts of isopropanol, 72 parts of VP, 48 parts of vinylimidazole and 0.6 part of di-tert-butyl peroxide were initially taken under nitrogen in a pressure reactor equipped with a stirrer and were heated to 130° C. Thereafter, a solution of 648 parts of vinylpyrrolidone, 432 parts of vinylimidazole and 1,100 parts of water and a solution of 5.4 parts of di-tert-butyl peroxide and 170 parts of isopropanol were metered in at 130° C. in the course of 4.5 hours and 5.5 hours, respectively. Polymerization and working up were carried out as in Example 1. The K value of the clear polymer solution was 51.9.

COMPARATIVE EXAMPLE

For comparison of the water solubilities, Example 3 from EP-A No. 104 042 was repeated. The resulting polymer solution was subjected to a steam distillation as in the present Example 1 in order to separate off the organic solvent. The purely aqueous polymer solution had a K value of 39.8 and was cloudy.

We claim:

1. A process for the preparation of a hydrazine-free N-vinyl-2-pyrrolidone polymer which dissolves in water and organic solvents to give a clear solution and contains not less than 50% by weight of N-vinyl-2-pyrrolidone as copolymerized units, wherein from 0.1 to 3% by weight, based on monomer, of di-tert-butyl peroxide, if necessary diluted up to 100 times in solution or emulsion, are added to a 10 to 80% strength by weight aqueous monomer solution, and the stirred mixture is kept for from 1 to 15 hours at from 100° to 160° C., the desired molecular weight being set in the Fikentscher K value range of from 10 to 100 by adding from 0 to 100% by weight, based on monomer, of a regulator.

2. A process as defined in claim 1, wherein the desired molecular weight is set by adding regulator and wherein the regulator used is isopropanol.

* * * * *